United States Patent
Ramesh et al.

(10) Patent No.: US 12,430,834 B2
(45) Date of Patent: Sep. 30, 2025

(54) VIDEO-GENERATION SYSTEM WITH STRUCTURED DATA-BASED VIDEO GENERATION FEATURE

(71) Applicant: Roku, Inc., San Jose, CA (US)

(72) Inventors: Sunil Ramesh, Cupertino, CA (US); Michael Cutter, Golden, CO (US); Charles Brian Pinkerton, Boulder, CO (US); Karina Levitian, Austin, TX (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/958,397

(22) Filed: Oct. 2, 2022

(65) Prior Publication Data

US 2024/0112390 A1    Apr. 4, 2024

(51) Int. Cl.
| | |
|---|---|
| G06T 13/40 | (2011.01) |
| G06F 40/40 | (2020.01) |
| G06T 13/20 | (2011.01) |
| G06T 13/80 | (2011.01) |
| G10L 13/04 | (2013.01) |

(52) U.S. Cl.
CPC .............. *G06T 13/40* (2013.01); *G06F 40/40* (2020.01); *G06T 13/205* (2013.01); *G06T 13/80* (2013.01); *G10L 13/04* (2013.01)

(58) Field of Classification Search
CPC ....... G06T 13/40; G06T 13/205; G06T 13/80; G10L 13/00; G06F 40/40
See application file for complete search history.

(56) References Cited

U.S. PATENT DOCUMENTS

| | | | |
|---|---|---|---|
| 6,496,780 B1 * | 12/2002 | Harris | G01W 1/04 |
| | | | 702/3 |
| 11,363,347 B1 * | 6/2022 | Eldering | H04N 21/4524 |
| 2009/0044112 A1 * | 2/2009 | Basso | G10L 13/08 |
| | | | 715/706 |
| 2011/0161085 A1 * | 6/2011 | Boda | G10L 13/00 |
| | | | 704/E13.011 |
| 2017/0194032 A1 * | 7/2017 | Walworth | G06F 40/186 |
| 2018/0101504 A1 * | 4/2018 | DiTomaso | G10L 13/00 |
| 2021/0327404 A1 * | 10/2021 | Savchenkov | G10L 13/08 |
| 2021/0390748 A1 * | 12/2021 | Liao | G06V 10/82 |

(Continued)

OTHER PUBLICATIONS

Glahn, Harry R., and David P. Ruth. "The new digital forecast database of the National Weather Service." Bulletin of the American Meteorological Society 84, No. 2 (2003): 195-202. (Year: 2003).*

(Continued)

*Primary Examiner* — King Y Poon
*Assistant Examiner* — Vincent Peren
(74) *Attorney, Agent, or Firm* — McDonnell Boehnen Hulbert & Berghoff LLP

(57) ABSTRACT

In one aspect, an example method includes (i) obtaining, by a computing system, structured data; (ii) generating, by the computing system using a natural language generator, a textual description of the structured data; (iii) transforming, by the computing system using a text-to-speech engine, the textual description of the structured data into synthesized speech; and (iv) generating, by the computing system using the synthesized speech, a synthetic video comprising the synthesized speech.

19 Claims, 6 Drawing Sheets

(56) References Cited

U.S. PATENT DOCUMENTS

2022/0076470 A1* 3/2022 Yang .................. G06N 3/088
2022/0084273 A1   3/2022 Chao

OTHER PUBLICATIONS

Xu et al. (Xu, R., Cao, J., Wang, M., Chen, J., Zhou, H., Zeng, Y., Wang, Y., Chen, L., Yin, X., Zhang, X. and Jiang, S., 2020. Xiaomingbot: A multilingual robot news reporter. arXiv preprint arXiv:2007.08005) (Year: 2020).*

John Son; DeepBrain AI to Debut AI Studios at the 2022 NAB Show; Apr. 6, 2022, 11:00 ET; 4 pgs; https://www.prnewswire.com/news/deepbrain-ai/.

Rephrase.ai Home | Rephrase.ai; Aug. 23, 22, 8:35 AM; pp. 1/16; https://www.rephrase.ai.

Samsung's Neon 'artificial humans' are confusing everyone. We set the record straight; Aug. 23, 2022, 8:36 AM; pp. 1/16; https://www.cnet.com/tech/mobile/samsung-neon-artificial-humans-are-confusing-everyone-we-set-record-straight/.

Synthesia | #1 AI Video Generation Platform; Create professional videos in 60+ languages; Aug. 23, 2022, 8:33 AM; pp. 1/16; https://www.synthesia.io.

Wang et al.; Write-A-Video: Computational Video Montage from Themed Text; ACM Trans. Graph. 38, 6, Article 177 (Nov. 2019), 13 pages. https://doi.org/10.1145/3355089.3356520.

Vougioukas et al.; Realistic Speech-Driven Facial Animation with GANs; International Journal of Computer Vision (2020) 128:1398-1413; https://doi.org/10.1007/s11263-019-01251-8.

Xu et al., "Xiaomingbot: A Multilingual Robot News Reporter", Arxiv.org, Cornell University (Jul. 12, 2020).

"Xiaomingbot—Multilingual Robot News Reporter" (Jun. 19, 2020), https://youtube.com/watch?v=V51B44WHs98 (retrieved Dec. 12, 2023).

Vougioukas et al., "End-to-End Speech-Driven Facial Animation with Temporal GANSs", Arxiv.org, Cornell University (May 23, 2018).

* cited by examiner

VIDEO-GENERATION SYSTEM WITH STRUCTURED DATA-BASED VIDEO GENERATION FEATURE

USAGE AND TERMINOLOGY

In this disclosure, unless otherwise specified and/or unless the particular context clearly dictates otherwise, the terms "a" or "an" mean at least one, and the term "the" means the at least one.

SUMMARY

Content creators can generate videos for distribution via digital channels. Such digital channels can include websites, social media, and streaming services.

There is wide variety of structured data available on the Internet and from other sources. Structured data includes data types with patterns that make them easily searchable. For instance, structured data includes data that is in a standardized format having a well-defined structure such that the format and meaning of the data is explicitly understood. As such, structured data is easily accessible using computer algorithms. Structured data can include textual data and/or numeric data. Examples of structured data include sports box scores, weather forecasts, financial information, real estate records, entertainment summaries, etc.

If a content creator is able to produce videos utilizing such structured data, the structured data would serve as an abundant source for video generation. Hence, it is desirable to leverage structured data to produce videos.

In one aspect, an example computing system is described. The computing system is configured for performing a set of acts including (i) obtaining structured data; (ii) generating, using a natural language generator, a textual description of the structured data; (iii) transforming, using a text-to-speech engine, the textual description of the structured data into synthesized speech; and (iv) generating, using the synthesized speech, a synthetic video including the synthesized speech.

In another aspect, an example method is described. The method includes (i) obtaining, by a computing system, structured data; (ii) generating, by the computing system using a natural language generator, a textual description of the structured data; (iii) transforming, by the computing system using a text-to-speech engine, the textual description of the structured data into synthesized speech; and (iv) generating, by the computing system using the synthesized speech, a synthetic video comprising the synthesized speech.

In another aspect, a non-transitory computer-readable medium is described. The non-transitory computer-readable medium has stored thereon program instructions that upon execution by a computing system, cause performance of a set of acts. The set of acts include (i) obtaining structured data; (ii) generating, using a natural language generator, a textual description of the structured data; (iii) transforming, using a text-to-speech engine, the textual description of the structured data into synthesized speech; and (iv) generating, using the synthesized speech, a synthetic video including the synthesized speech.

DETAILED DESCRIPTION

I. Overview

Content creators desire to create videos quickly and efficiently. As noted above, there is a wide variety of structured data available on the Internet and from other sources. When presented as text, the structured data might not appeal to some audiences. However, the structured data may be more interesting to an audience when presented in video form.

Moreover, if a synthetic video that is indistinguishable from a real video can be generated from structured data in an automated or semi-automated fashion, it may be more efficient and cost-effective to generate the synthetic video than to generate a real video from the structured data through traditional video production and editing processes.

Disclosed herein are methods and systems for generating videos using structured data. In an example method, a computing system obtains structured data and generates a textual description of the structured data. In some instances, the computing system generates the textual description using a natural language generator. After generating the textual description, the computing system transforms the textual description into synthesized speech using a text-to-speech engine. Further, the computing system then uses the synthesized speech to generate a synthetic video that includes the synthesized speech.

In some examples, the synthetic video depicts a human speaking the textual description. A computing system can use a sample video of the human speaking and a video-synthesis model to generate a synthetic video that depicts the human speaking. By leveraging deep learning techniques, the synthetic video may look as if the human had spoken the textual description in a live, real camera recording. Hence, an audience may be unable to distinguish the synthetic video from a real recording of the human.

Moreover, in some examples, the synthetic video might not depict anyone speaking the textual description. Instead, the synthetic video can include one or more images and an accompanying audio track that includes the synthesized speech.

Various other features of these systems and methods are described hereinafter with reference to the accompanying figures.

II. Example Architecture

A. Video-Generation System

Figure 1:
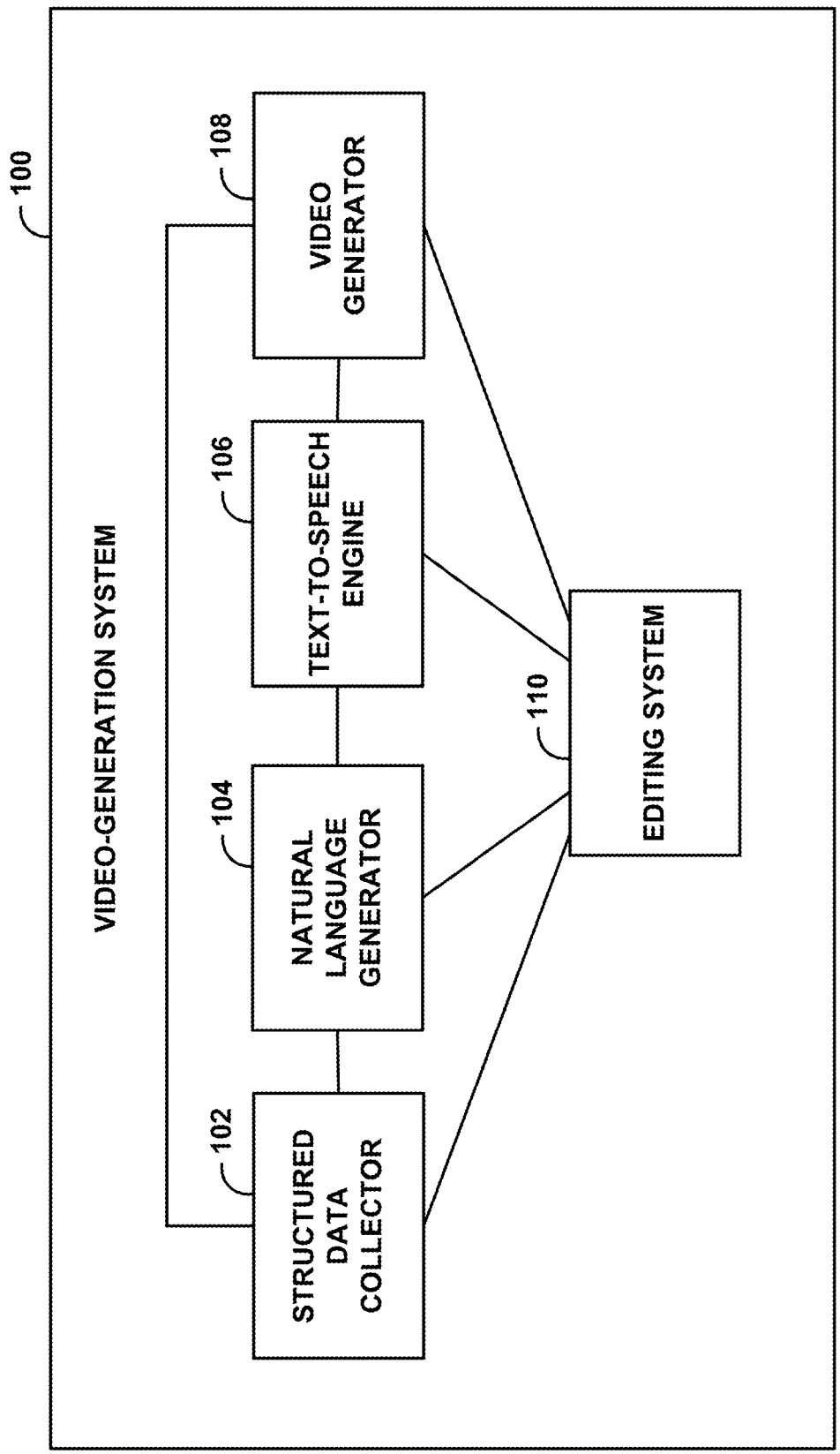
FIG. 1 is a simplified block diagram of an example video-generation system in which various described principles can be implemented.

FIG. 1 is a simplified block diagram of an example video-generation system 100. The video-generation system 100 can include various components, such as a structured data collector 102, a natural language generator 104, a text-to-speech engine 106, a video generator 108, and/or an editing system 110.

The video-generation system 100 can also include one or more connection mechanisms that connect various components within the video-generation system 100. For example, the video-generation system 100 can include the connection mechanisms represented by lines connecting components of the video-generation system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The video-generation system 100 and/or components thereof can take the form of a computing system, an example of which is described below.

In some instances, the video-generation system 100 can include multiple instances of at least some of the described components.

B. Computing System

Figure 2:
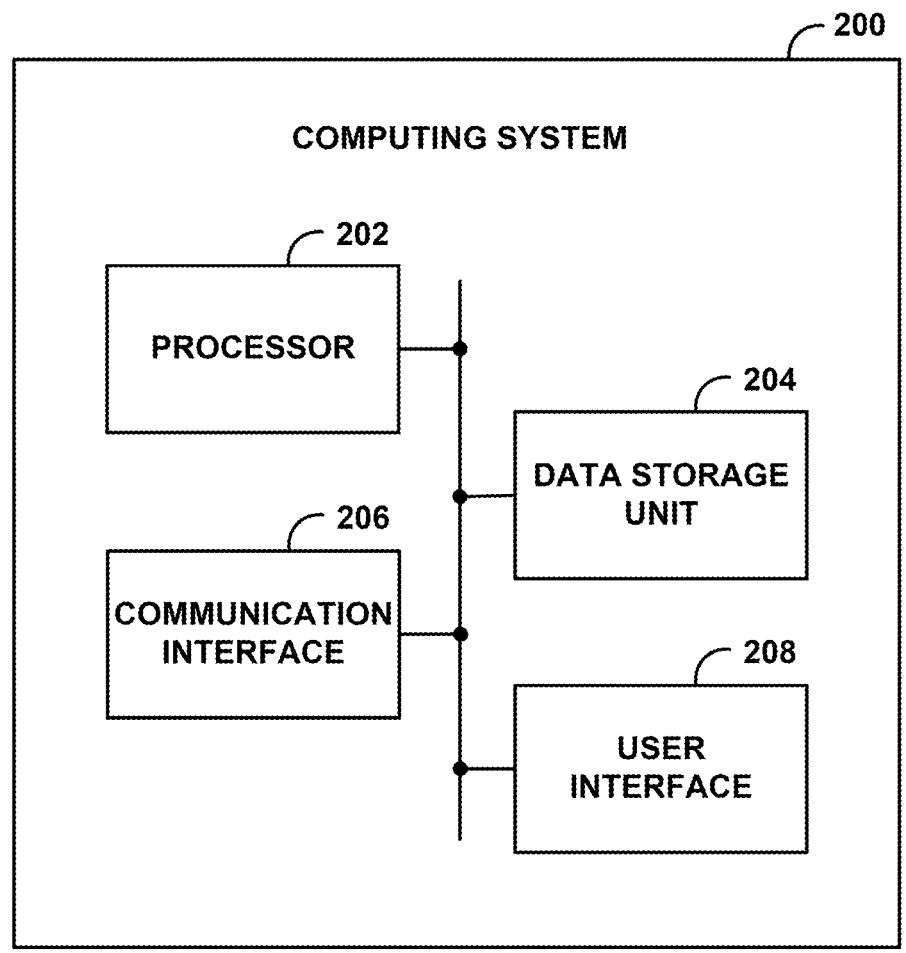
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the video-generation system 100 and/or components thereof can take the form of a computing system, such as the computing system 200. In some cases, some or all these entities can take the form of a more specific type of computing system, such as a desktop computer, a laptop, a tablet, a mobile phone, among other possibilities.

III. Example Operations

The video-generation system 100 and/or components thereof can be configured to perform and/or can perform one or more operations. Examples of these operations and related features will now be described with reference to FIGS. 3-5.

A. Operations Related to Obtaining Structured Data

For context, general operations and examples related to the structured data collector 102 will now be described. To begin, the structured data collector 102 obtains structured data. As noted above, structured data includes data that is in a standardized format having a well-defined structure such that the format and meaning of the data is explicitly understood. Examples of structured data include sports box scores, weather forecasts, financial information, real estate records, entertainment summaries, etc.

In some examples, the structured data collector 102 can obtain structured data from a database. The database can store records of structured data. The records may be organized by subject matter and date, for instance.

Additionally or alternatively, the structured data collector 120 can extract structured data through data scraping. For instance, the structured data collector 120 can use web scraping, web harvesting, and/or web data extraction to extract structured data from websites.

The structured data collector 120 can also obtain structured data by receiving data from a computing system, with the data being input by a user via a user interface (e.g., a keyboard and/or microphone) of the computing system.

Figure 3:
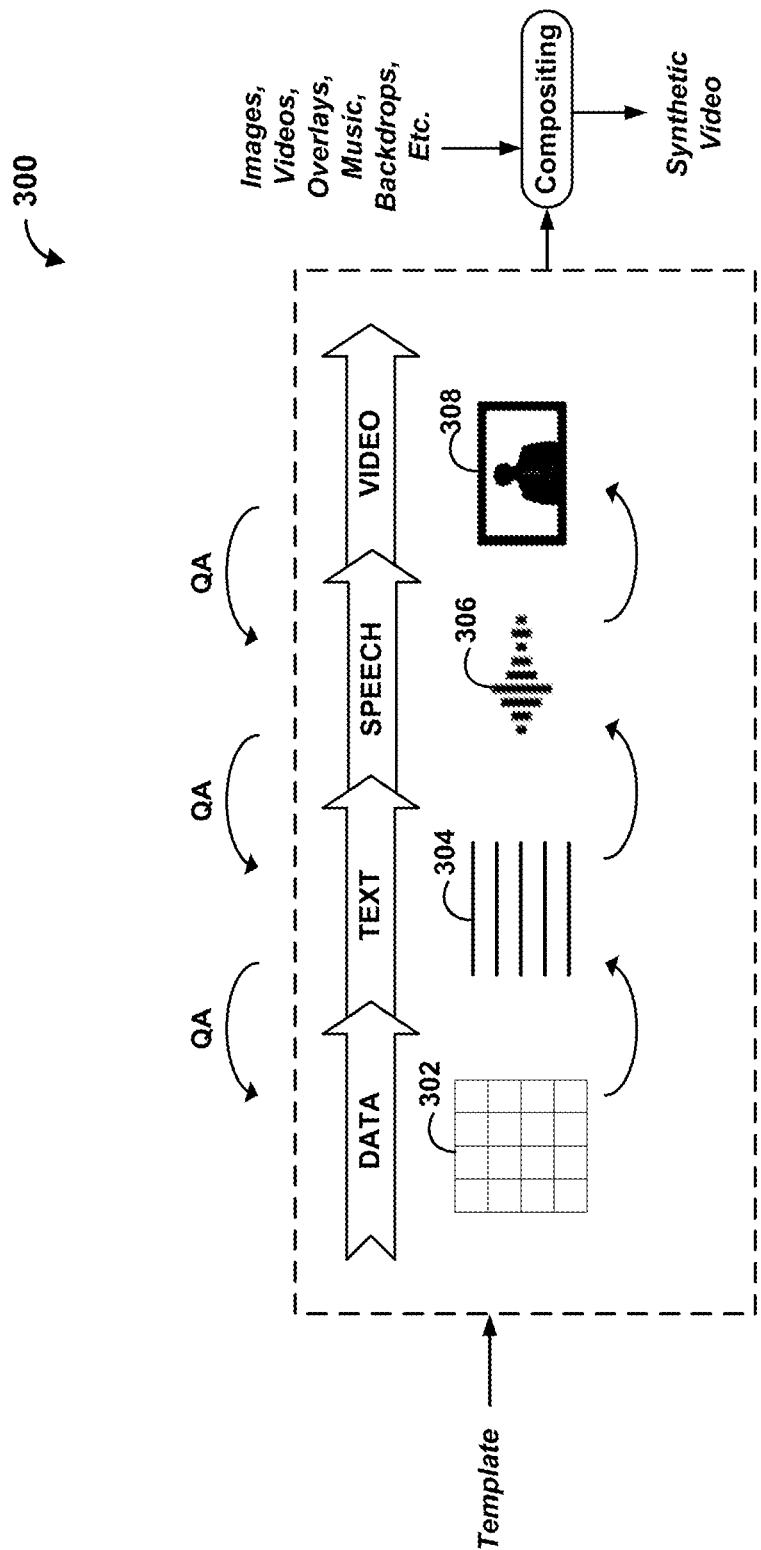
FIG. 3 is a diagram of an example video-generation process and related concepts.

FIG. 3 illustrates the role of such structured data in the video-generation process. More specifically, FIG. 3 is a diagram 300 of an example video-generation process. As shown in FIG. 3, structured data 302 is obtained as input for the video-generation process.

In some examples, the structured data 302 is obtained using a template. The template can include a set of data fields for which corresponding text is desired. As one example, the template can include a weather template that includes placeholders for days of the week, temperatures, and other weather data. As another example, the template can include a sports template that includes placeholders for aspects of a sporting event, such as any data available in a box score and/or summary for the sporting event. As still another example, the template can include a real estate template that includes placeholders for aspects of a real estate listing. In some examples, the template can include an identifier that specifies a source of the structured data (e.g., a website). With this approach, the structured data collector 102 can use the identifier to extract the structured data that is appropriate for the template.

B. Operations Related to Generating a Textual Description

For context, general operations and examples related to the natural language generator 104 and the editing system 110 will now be described. In line with the discussion above, the natural language generator 104 can generate a textual description 304 of the structured data 302. The natural language generator 104 can include one or machine learning models that produces human-readable text (e.g., sentences) in one or more languages using structured data.

One example of a natural language generator is the GPT-3 language model developed by OpenAI. A similar example of a natural language generator is Wu-Dao. Other examples include Automated Insight's Wordsmith and the Washington Post's Heliograf.

In some examples, the natural language generator 104 generates the textual description 304 using a multi-stage approach. In a first stage, the natural language generator 104 interprets the structured data 302. Interpreting the structured data 302 can involve identifying a pattern in the structured data 302. For instance, structured data can identify a winner of a sporting event as well as a goal scorer. During the interpreting stage, the natural language generator can identify the winner and a goal scorer.

A next stage can include document planning. During the document planning stage, the natural language generator 104 organizes features in the structured data to create a narrative. In some cases, the natural language generator 104 uses rule-based templates to pair identified features with targeted sequences. For instance, in the case of a football game, the narrative may include an opening paragraph describing the result of the football game, as well as other paragraphs indicating events that occurred during different parts of the football game, the current records of the teams, and the future schedules for the teams.

Additional stages can include a sentence aggregation stage, where multiple sentences can be aggregated together, and a grammaticalization stage that validates the generated text according to syntax, morphology, and orthography rules.

In some examples, the natural language generator 104 refines and improves the generated text using back translation and/or paraphrasing. These techniques can improve the readability of the textual description 304.

The editing system 110 can include a computing system that allows a user to review the textual description 304 generated by the natural language generator 104 as part of a quality assurance process. For instance, the editing system 110 can present the textual description 304 on a display, and a user of the editing system 110 can approve or reject the textual description 304 using a user interface of the editing system 110.

C. Operations Related to Generating Synthesized Speech

For context, general operations and examples related to the text-to-speech engine 106 and the editing system 110 will now be described. In line with the discussion above, the text-to-speech engine 106 can transform the textual description 304 into synthesized speech 306. The text-to-speech engine 106 can take any of a variety of forms depending on the desired implementation.

By way of example, the text-to-speech engine 106 can include a deep learning-based synthesis model that uses deep neural networks (DNNs) to produce artificial speech from text. The deep learning-based synthesis model can be trained using training data that includes recorded speech and the associated input text. Examples of deep learning-based synthesis models include WaveNet developed by DeepMind, Tacotron developed by Google, and VoiceLoop developed by Facebook.

In some examples, the text-to-speech engine 106 obtains a speech sample for a speaker, and transform the textual description 304 into the synthesized speech 306 using the speech sample. For instance, a deep learning-based synthesis model can transfer learning from speaker verification to achieve text-to-speech synthesis. More specifically, the deep learning-based synthesis model can use pre-trained speaker verification models as speaker encoders to extract speaker embeddings from a speech sample for a speaker. Extracting the speaker embeddings allows the deep learning-based synthesis model to learning the style and characteristics of the speaker, so that the synthesized speech output by the deep learning-based synthesis model sounds like the speaker. The speech sample can be audio extracted from a sample video.

The editing system 110 can include a computing system that allows a user to review the synthesized speech 306 generated by the text-to-speech engine 106 as part of a quality assurance process. For instance, the editing system 110 can playback the synthesized speech 306, and a user of the editing system 110 can approve or reject the textual description 304 using a user interface of the editing system 110.

D. Operations Related to Generating a Synthetic Video

For context, general operations and examples related to the video generator 108 and the editing system 110 will now be described. In line with the discussion above, the video generator 108 generates a synthetic video 308 including the synthesized speech 306 using the synthesized speech 306. Various types of synthetic videos 308 are contemplated. The complexity of the video generator 108 can vary depending on the desired implementation.

In some examples, the synthetic video 308 includes one or more images and an accompanying audio track comprising the synthesized speech 306. For instance, the synthetic video 308 can include one or more images and/or video clips from a sporting event, and the synthesized speech 306 can explain details of the sporting event. Alternatively, the synthetic video 308 can include one or more images and/or video clips related to a real estate property, and the synthesized speech 306 can explain details about the real estate property. The video generator 108 can generate these types of videos by combining the synthesized speech 306 with images, videos, overlays, music, and/or backdrops. For instance, an editor can use editing system 110 to select images, videos, overlays, music, and/or backdrops for different parts of the synthetic video 308, and the video generator 108 can render a video having the appropriate features based on the selection(s).

In other examples, the synthetic video 308 can depict a human speaking the synthesized speech 306. In this implementation, the video generator 108 can generate the synthetic video 308 using a sample video of the human speaking and a video-synthesis model. The human speaking in the sample video can be a real human or a computer-generated (e.g., virtual) human. The video generator 108 can use the video-synthesis model to determine facial expressions for the human while the human speaks the synthesized speech. Additionally, the video generator 108 can use the video-synthesis model to determine facial expressions for the human while the human speaks the synthesized speech.

In some examples, the video-synthesis model is a temporal generative adversarial network (GAN). For instance, the video-synthesis model can include multiple discriminators that cooperate to perform a spatial-temporal integration of a sample video of the human and the synthesized speech to form the synthetic video 308, which looks as if the human had spoken the textual description 304 in a live, real camera recording.

Figure 4:
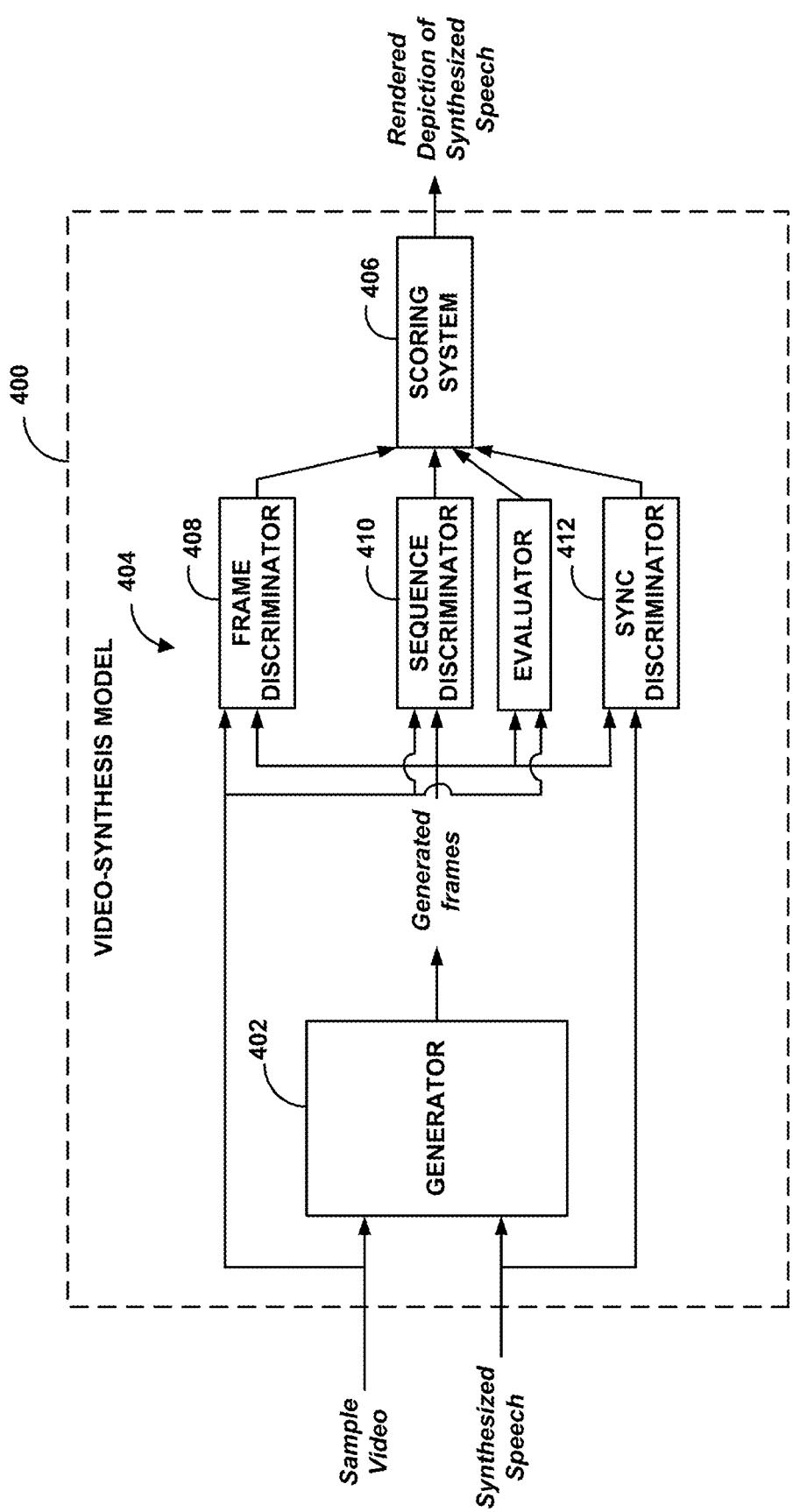
FIG. 4 is a simplified block diagram of an example video-synthesis model.

FIG. 4 is a simplified block diagram of an example video-synthesis model 400. As shown in FIG. 4, the video-synthesis model includes a generator 402, an ensemble of discriminators 404, and a scoring system 406.

The generator 402 receives as input a sample video of a human speaking and synthesized speech. The generator 402 has an encoder-decoder structure and includes a content encoder, identity encoder, and a noise generator, and frame decoder. In one example, the human's identity (e.g., facial expressions and, optionally, gestures) is encoded by the identity encoder using a first convolutional neural network (CNN) that converts an image from the sample video into a first latent space representation. Additionally, an audio frame (e.g., 0.2 seconds) of the synthesized speech is encoded by the content encoder using a second CNN that converts the audio frame into a second latent space representation. The frame decoder then combines the first latent space representation, the second latent space representation, and noise generated by the noise generator into a latent representation for a generated frame. This process is repeated for different audio frames to generate multiple generated frames.

The ensemble of discriminators 404 include multiple discriminators that allow for generation of difference aspects of videos. By way of example, as shown in FIG. 4, the ensemble of discriminators 404 includes a frame discriminator 408, a sequence discriminator 410, and a synchronization discriminator 412.

The frame discriminator 408 distinguishes between real and synthetic frames using adversarial training. For example, the frame discriminator 404 can include a CNN that determines, at a frame-level whether a generated frame, from the generator 402, is realistic in terms of facial expressions and, optionally, gestures. The frame discriminator 404 can be trained using frames from the sample video. The frame discriminator 408 can output a score indicative of whether a generated frame is realistic.

The sequence discriminator 408 determines whether a sequence of generated frames is real or synthetic using adversarial training. For example, the sequence discriminator 408 can include a CNN with spatial-temporal convolutions that extracts and analyzes movements across generated frames of the sequence. The sequence discriminator 410 can be trained using sequences of frames from the sample video. The sequence discriminator 410 can output a score indicative of whether a sequence of frames is realistic.

The ensemble of discriminators 408 can also include other types of discriminators that allow for generating other aspects at the frame or sequence of frames level.

Finally, the synchronization discriminator 412 determines whether the generated frames are in or out of synchronization with a corresponding portion of the synthesized speech. For example, the synchronization discriminator 412 can include an audio encoder that computes an audio embedding, a video encoder that computes a video embedding, and a distance calculator that computes a Euclidian distance between the embeddings as a measure of synchronization. The synchronization discriminator 412 can be trained using corresponding audio portions and sequences of frames from the sample video. The synchronization discriminator 412 can output a score indicative of whether the synchronization between the synthesized speech and the generated sequence of frames is realistic.

The scoring system 406 utilizes scores output by the ensemble of discriminators to determine whether to render the generated frames as a synthetic video. For instance, the scoring system 406 can be configured to determine a weighted average of scores about by the frame discriminator 408, the sequence discriminator 410, and the synchronization discriminator 412 and compare the weighted average to a threshold. Based on determining that the weighted average exceeds a threshold, the scoring system can output the generated frames as a depiction of the synthesized speech. Whereas, based on determining that the weighted average does not exceed the threshold, the scoring system can cause forgo outputting the generated frames and, optionally, continue to generate new frames in an effort to achieve a more realistic video. As such, in some examples, the scoring system 406 servers as a gatekeeper that regulates whether or not the generated frames look realistic enough to merit rendering a synthetic video using the generated frames.

Alternatively, the scoring system 406 can be configured to compare scores output by individual discriminators of the ensemble of discriminators 404 to respective thresholds. Upon determining that the scores output by each of the discriminators of the ensemble of discriminators 404 exceeds a respective threshold, the scoring system can output the generated frames as a depiction of the synthesized speech.

The output of the video-synthesis model 400 is a rendered depiction of the human in the sample video speaking the synthesized speech 306. In some examples, the video generator 108 combines the rendered depiction of the human speaking the synthesized speech 306 with images, videos, overlays, music, and/or backdrops. For instance, an editor can use editing system 110 to select images, videos, overlays, music, and/or backdrops for different parts of the synthetic video 308, and the video generator 108 can render a video having the appropriate features based on the selection(s). As one example, an editor can select a video snippet to be displayed (e.g., as an overlay or occupying the entire frame) between two instances of synthesized speech.

In some examples, the structured data 302 can inform the video-generation process. For instance, the video generator 108 can use a rule to process part of the structured data 302 and decide which aspects of the structured data 302 to include and/or not include in the synthetic video. As one example, the structured data 302 can be weather data that includes a humidity forecast for a region. The video generator 108 may use a weather rule to decide whether or not to render a weather graphic displaying the humidity forecast during a segment of the synthetic video. In one approach, the rule may cause the video generator to include the weather graphic for the humidity forecast when the humidity is above a threshold (e.g., 75%), but to forgo displaying the weather graphic when the humidity is not above the threshold.

Figure 5:
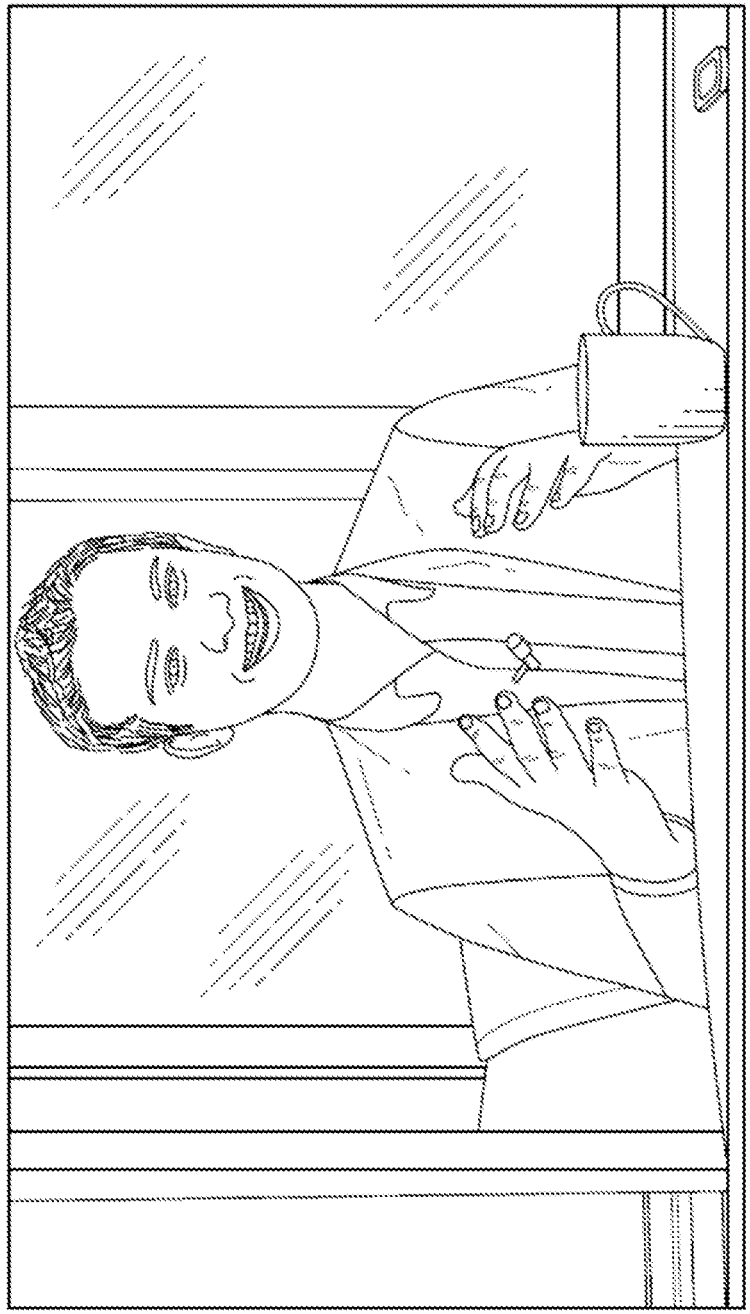
FIG. 5 is a conceptual illustration of an example frame of a synthetic video.

FIG. 5 conceptually illustrates an example frame of a synthetic video. As shown in FIG. 5, the frame depicts a human as a newscaster that is describing an event. The frame also includes a backdrop and other objects (e.g., a desk, coffee, mug, and cellular phone). The video-generation system 100 can generate the frame of the synthetic video by obtaining structured data for the event, generating a textual description from the structured data, transforming the textual description into synthesized speech, and generating a rendering of a human speaking the synthesized speech.

In some examples, by generating the synthetic video using a video-synthesis model, such as the video-synthesis model 400, the frame of the synthetic video (and the other frames of the video) may be indistinguishable from reality. Further, by leveraging the structured data, the synthetic video can be produced in an efficient manner, decreasing the time and labor costs typically required in producing, editing, and publishing videos.

E. Example Method

Figure 6:
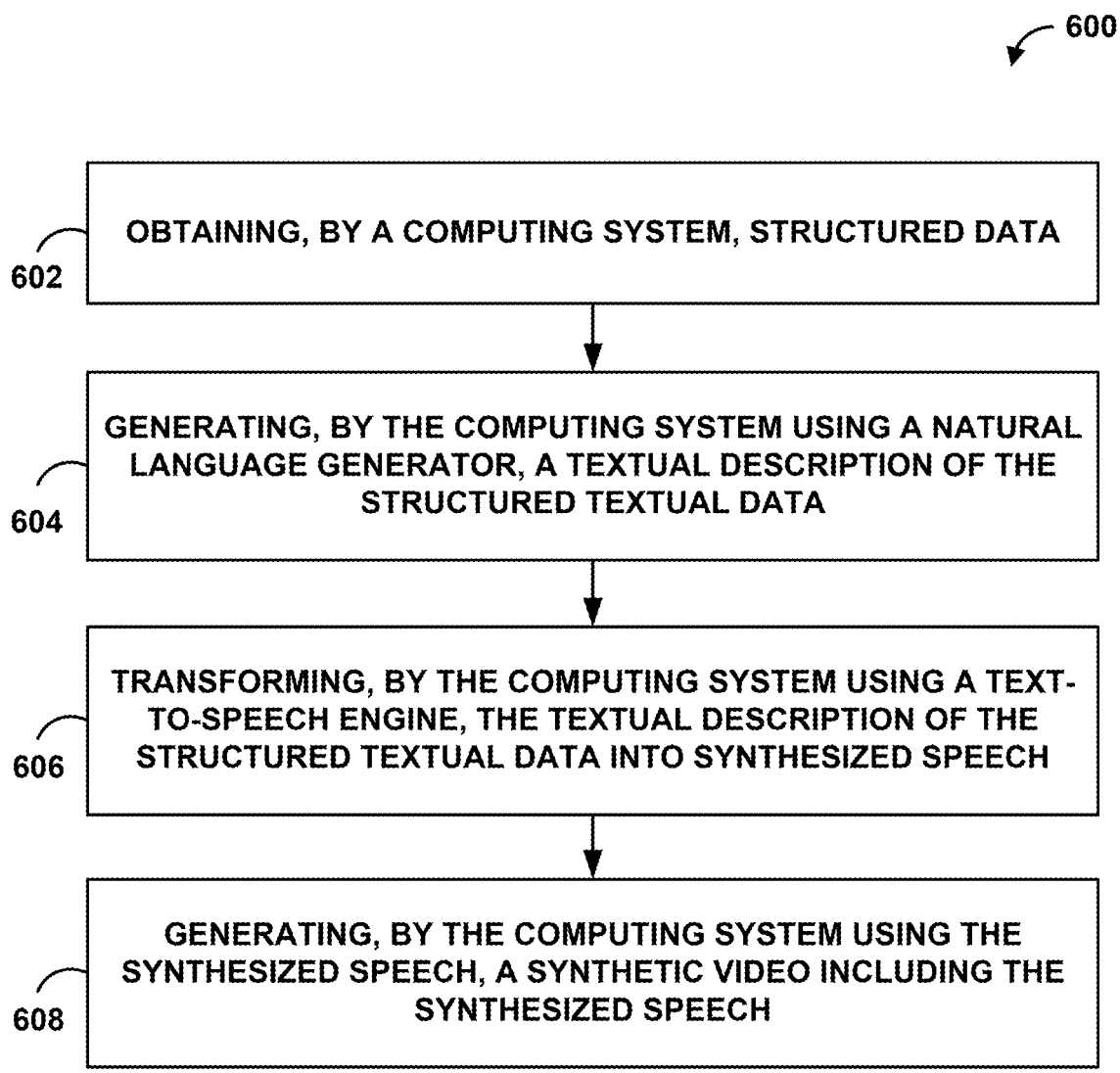
FIG. 6 is a flow chart of an example method.

FIG. 6 is a flow chart illustrating an example method 600. The method 600 can be carried out by a video-generation system, such as the video-generation system 100, or more generally, by a computing system. At block 602, the method 600 includes obtaining, by a computing system, structured data. At block 604, the method 600 includes generating, by the computing system using a natural language generator, a textual description of the structured data. At block 606, the method 600 includes transforming, by the computing system, using a text-to-speech engine, the textual description of the structured data into synthesized speech. And at block 608, the method 600 includes generating, by the computing system, using the synthesized speech, a synthetic video including the synthesized speech.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
obtaining, by a computing system, structured data relating to an event;
generating, by the computing system using a natural language generator, a textual narrative of the event;
transforming, by the computing system using a text-to-speech engine, the textual narrative of the event into synthesized speech;
processing, by the computing system, the obtained structured data to determine that a part of the obtained structured data in the form of textual data and/or numeric data satisfies one or more conditions;
using the determination that the part of the obtained structured data in the form of textual data and/or numeric data satisfies one or more conditions, as a basis to render a graphic corresponding to the part of the obtained structured data; and
generating, by the computing system using the synthesized speech and the rendered graphic corresponding to the part of the obtained structured data,, a synthetic video comprising the synthesized speech and the generated graphic corresponding to the part of the obtained structured data,
wherein generating the synthetic video comprises:
generating a sequence of frames;
for each frame in the generated sequence of frames, outputting a first score for that given frame, wherein the first score is indicative of whether that given frame is realistic;
for the generated sequence of frames, outputting a second score, wherein the second score is indicative of whether the generated sequence of frames is realistic;
for the generated sequence of frames and the generated synthesized speech, outputting a third score indicative of whether synchronization between the generated sequence of frames and the generated synthesized speech is realistic;
determining a weighted average of the outputted first, second, and third scores;
determining that the determined weighted average exceeds a threshold; and
based on determining that the determined weighted average exceeds the threshold, using at least the generated sequence of frames and the generated synthesized speech to generate the synthetic video.

2. The method of claim 1, further comprising obtaining a speech sample for a speaker,
wherein the text-to-speech engine transforms the textual narrative of the event into synthesized speech by the speaker using the speech sample for the speaker.

3. The method of claim 2, wherein the synthetic video comprises one or more images and an accompanying audio track comprising the synthesized speech by the speaker.

4. The method of claim 1, further comprising obtaining a sample video of a human speaking,
wherein generating the synthetic video comprises generating the synthetic video using the sample video of the human speaking and a video-synthesis model, and
wherein the synthetic video depicts the human speaking the synthesized speech.

5. The method of claim 4, wherein:
the video-synthesis model is a temporal generative adversarial network having an ensemble of discriminators, and
the ensemble of discriminators are configured to perform a spatial-temporal integration of the sample video of the human speaking and the synthesized speech.

6. The method of claim 1, wherein
the structured data comprises weather data, sports data, financial data, real estate data, or entertainment data.

7. A computing system comprising a processor and a non-transitory computer-readable medium having stored thereon program instructions that upon execution by the processor, cause performance of a set of acts comprising:
obtaining structured data relating to an event;
generating, using a natural language generator, a textual narrative of the event;
transforming, using a text-to-speech engine, the textual narrative of the event into synthesized speech;
processing the obtained structured data to determine that a part of the obtained structured data in the form of textual data and/or numeric data satisfies one or more conditions;
using the determination that the part of the obtained structured data in the form of textual data and/or numeric data satisfies one or more conditions, as a basis to render a graphic corresponding to the part of the obtained structured data; and
generating, using the synthesized speech and the rendered graphic corresponding to the part of the obtained structured data, a synthetic video comprising the synthesized speech and the generated graphic corresponding to the part of the obtained structured data,
wherein generating the synthetic video comprises:
generating a sequence of frames;
for each frame in the generated sequence of frames, outputting a first score for that given frame, wherein the first score is indicative of whether that given frame is realistic;
for the generated sequence of frames, outputting a second score, wherein the second score is indicative of whether the generated sequence of frames is realistic;
for the generated sequence of frames and the generated synthesized speech, outputting a third score indicative of whether synchronization between the generated sequence of frames and the generated synthesized speech is realistic;
determining a weighted average of the outputted first, second, and third scores;
determining that the determined weighted average exceeds a threshold; and
based on determining that the determined weighted average exceeds the threshold, using at least the generated sequence of frames and the generated synthesized speech to generate the synthetic video.

8. The computing system of claim 7, wherein:
the set of acts further comprises obtaining a speech sample for a speaker, and
the text-to-speech engine transforms the textual narrative of the event into synthesized speech by the speaker using the speech sample for the speaker.

9. The computing system of claim 8, wherein the synthetic video comprises one or more images and an accompanying audio track comprising the synthesized speech by the speaker.

10. The computing system of claim 7, wherein:
the set of acts further comprises obtaining a sample video of a human speaking,
generating the synthetic video comprises generating the synthetic video using the sample video of the human speaking and a video-synthesis model, and
the synthetic video depicts the human speaking the synthesized speech.

11. The computing system of claim 10, wherein:
the video-synthesis model is a temporal generative adversarial network having an ensemble of discriminators, and
the ensemble of discriminators are configured to perform a spatial-temporal integration of the sample video of the human speaking and the synthesized speech.

12. The computing system of claim 11, wherein generating the synthetic video comprises determining facial expressions for the human while the human speaks the synthesized speech using a frame discriminator and a sequence discriminator.

13. The computing system of claim 11, wherein generating the synthetic video comprises determining gestures for the human while the human speaks the synthesized speech using a frame discriminator and a sequence discriminator.

14. The computing system of claim 7, wherein the structured data comprises weather data, sports data, financial data, real estate data, or entertainment data.

15. A non-transitory computer-readable medium having stored thereon program instructions that upon execution by a computing system, cause performance of a set of acts comprising:
obtaining structured data relating to an event;
generating, using a natural language generator, a textual narrative of the event;
transforming, using a text-to-speech engine, the textual narrative of the event into synthesized speech;
processing the obtained structured data to determine that a part of the obtained structured data in the form of textual data and/or numeric data satisfies one or more conditions;
using the determination that the part of the obtained structured data in the form of textual data and/or numeric data satisfies one or more conditions, as a basis to render a graphic corresponding to the part of the obtained structured data; and
generating, using the synthesized speech and the rendered graphic corresponding to the part of the obtained structured data, a synthetic video comprising the synthesized speech and the generated graphic corresponding to the part of the obtained structured data,
wherein generating the synthetic video comprises:
generating a sequence of frames;
for each frame in the generated sequence of frames, outputting a first score for that given frame, wherein the first score is indicative of whether that given frame is realistic;
for the generated sequence of frames, outputting a second score, wherein the second score is indicative of whether the generated sequence of frames is realistic;
for the generated sequence of frames and the generated synthesized speech, outputting a third score indicative of whether synchronization between the generated sequence of frames and the generated synthesized speech is realistic;
determining a weighted average of the outputted first, second, and third scores;
determining that the determined weighted average exceeds a threshold; and
based on determining that the determined weighted average exceeds the threshold, using at least the generated sequence of frames and the generated synthesized speech to generate the synthetic video.

16. The non-transitory computer-readable medium of claim 15, wherein:

the set of acts further comprises obtaining a speech sample for a speaker, and the text-to-speech engine transforms the textual narrative of the event into synthesized speech by the speaker using the speech sample for the speaker.

17. The non-transitory computer-readable medium of claim 16, wherein the synthetic video comprises one or more images and an accompanying audio track comprising the synthesized speech by the speaker.

18. The non-transitory computer-readable medium of claim 15, wherein:

the set of acts further comprises obtaining a sample video of a human speaking, generating the synthetic video comprises generating the synthetic video using the sample video of the human speaking and a video-synthesis model, and the synthetic video depicts the human speaking the synthesized speech.

19. The non-transitory computer-readable medium of claim 18, wherein:

the video-synthesis model is a temporal generative adversarial network having an ensemble of discriminators, and the ensemble of discriminators are configured to perform a spatial-temporal integration of the sample video of the human speaking and the synthesized speech.

* * * * *